United States Patent
Tang et al.

(10) Patent No.: US 8,402,371 B2
(45) Date of Patent: Mar. 19, 2013

(54) METHOD AND SYSTEM FOR EMBEDDING COVERT DATA IN TEXT DOCUMENT USING CHARACTER ROTATION

(75) Inventors: Weng Sing Tang, Singapore (SG); Pern Chern Lee, Singapore (SG)

(73) Assignee: CrimsonLogic Pte Ltd, Singapore (SG)

( * ) Notice: Subject to any disclaimer, the term of this patent is extended or adjusted under 35 U.S.C. 154(b) by 203 days.

(21) Appl. No.: 12/933,207

(22) PCT Filed: Mar. 17, 2009

(86) PCT No.: PCT/SG2009/000090
§ 371 (c)(1),
(2), (4) Date: Sep. 17, 2010

(87) PCT Pub. No.: WO2009/116952
PCT Pub. Date: Sep. 24, 2009

(65) Prior Publication Data
US 2011/0022951 A1    Jan. 27, 2011

(30) Foreign Application Priority Data
Mar. 18, 2008 (SG) .................................. 200802188

(51) Int. Cl.
*G06F 17/21* (2006.01)
(52) U.S. Cl. ..................................................... 715/256
(58) Field of Classification Search ........... 715/256
See application file for complete search history.

(56) References Cited

U.S. PATENT DOCUMENTS

| | | | |
|---|---|---|---|
| 6,782,509 B1 * | 8/2004 | Hirayama et al. | 715/210 |
| 2003/0118211 A1 * | 6/2003 | Eguchi et al. | 382/100 |
| 2004/0001606 A1 * | 1/2004 | Levy | 382/100 |
| 2004/0091132 A1 * | 5/2004 | Eguchi et al. | 382/100 |
| 2004/0236716 A1 | 11/2004 | Carro | |
| 2005/0039021 A1 | 2/2005 | Alattar et al. | |
| 2006/0075241 A1 * | 4/2006 | Deguillaume et al. | 713/176 |
| 2006/0257002 A1 | 11/2006 | Shi et al. | |
| 2007/0014429 A1 | 1/2007 | He et al. | |
| 2007/0024915 A1 * | 2/2007 | Simske et al. | 358/3.28 |
| 2007/0047758 A1 * | 3/2007 | Pullen et al. | 382/100 |
| 2008/0098024 A1 * | 4/2008 | Kataoka et al. | 707/101 |

OTHER PUBLICATIONS

Naor et al., "Visual Cryptography", Lecture Notes in Computing Scinece (LNCS), vol. 950, Springer-Verlag, [1995] pp. 1-12.

* cited by examiner

*Primary Examiner* — Laurie Ries
*Assistant Examiner* — Frank D Mills
(74) *Attorney, Agent, or Firm* — Jacobson Holman PLLC (57) ABSTRACT

A method and system for embedding data covertly in a text document using character rotation encoding. A character that occurs in first and second occurrences is selected, where the first occurrence of the character is a reference character and the second occurrence of the character as a rotatable character. The rotational orientation of the rotatable character is altered to produce an altered character with a predetermined rotation with respect to the reference character, wherein the rotation represents the embedded covert data. A text document is formatted based on the altered character.

24 Claims, 8 Drawing Sheets

| Un-rotated | 2 degree | 4 degree | 6 degree | 8 degree | 10 degree | 12 degree |
|---|---|---|---|---|---|---|
| a | a | a | a | a | a | a |
| c | c | c | c | c | c | c |
| e | e | e | e | e | e | e |
| s | s | s | s | s | s | s |

| Techniques | Covert storage capacity | Robustness | | | Document Restrictions | Self verifiable? |
|---|---|---|---|---|---|---|
| | | PS | AT | Sc | | |
| Dots encoding | High: > 1000 bits (A4) | 1-2 | Partial | Yes | Binary text document without halftone | Yes |
| Space modulation (sentence or words) | Medium: 1 bit per sentence, word | ~10 | Yes | Yes | NIL | No |
| Luminance modulation | Medium: 1 bit per word | 1-2 | Yes | Yes | NIL | Yes |
| Halftone quantization | High: 1 bit per word or character | 1-2 | Yes | Yes | NIL | Yes |
| Component manipulations | High: 1 bit per component variation | 1-2 | Yes | Yes | NIL | No |
| Syntactic methods | Low: 1 bit per syntax variation | No limit | Yes | Yes | Language with sufficient syntax variations | No |
| Current Embodiments of the Invention | High: > 1 bit encoding per sentence | ~10 | Yes | Yes | NIL | Yes |

METHOD AND SYSTEM FOR EMBEDDING COVERT DATA IN TEXT DOCUMENT USING CHARACTER ROTATION

CROSS-REFERENCE TO RELATED APPLICATIONS

The present patent application is a nationalization of International application No. PCT/SG2009/000090, filed Mar. 17, 2009, published in English, which is based on, and claims priority from, Singapore Application No. 200802188-3, filed Mar. 18, 2008, both of which are incorporated herein by reference in their entireties.

FIELD OF THE INVENTION

This invention generally relates to a method and system for embedding data covertly in a text document using character rotation encoding.

BACKGROUND

Digital watermarking is a well researched area in the signal processing community. Many techniques been devised to hide information covertly in text and image documents. Hiding data is commonly termed "steganography" in the cryptography community. Steganography for text and image documents differs greatly since modifying pixels in an image has much less visual effect than modifying pixels in text. Therefore, existing steganography techniques for image documents are not directly applicable to text documents.

Conventional methods for data hiding in text documents include dot encoding, space modulation (line shift coding, word shift coding), luminance modulation, halftone quantization, component manipulations and syntactic methods.

Conventional methods each have their own advantages and disadvantages. For example, dot encoding has high data hiding capacity but is typically vulnerable to printing and scanning of the text document because noise is introduced and interferes with decoding the dots. On the other hand, syntactic methods are resilient to printing and scanning but have low data capacity and are not self-verifiable.

There is an increasing need to prevent unauthorized disclosure of important information in text documents, especially in this knowledge-based era. There is also a need to discourage improper information disclosure by putting a track and trace mechanism in a printed text document. In case of information leakage, the source of leakage (person who printed the document) can be identified. There is also a need for data hiding with high capacity that is resilient to printing and scanning, accommodates a wide range of text documents with little or no restrictions, and is self-verifiable.

SUMMARY

An aspect of the invention is a method for embedding covert data in a text document, the method comprising providing the document with a character that occurs in first and second occurrences, selecting the first occurrence of the character as a reference character and the second occurrence of the character as a rotatable character, altering a rotational orientation of the rotatable character to produce an altered character with a predetermined rotation with respect to the reference character, wherein the rotation represents the embedded covert data, and formatting the document to produce a formatted document based on the altered character.

In embodiments of the method, the method may further comprise providing the document with multiple characters that include the character, analyzing a frequency of the multiple characters, and selecting the character from the multiple characters in response to the character occurring most frequently in the multiple characters. The method may further comprise providing the document with multiple characters that include first and second characters, analyzing a frequency of the multiple characters, selecting the first and second characters from the multiple characters in response to the first and second characters occurring most frequently in the multiple characters to produce selected characters; and for each of the selected characters, selecting a first occurrence of the selected character as a selected reference character and a second occurrence of the selected character as a selected rotatable character, altering a rotational orientation of the selected rotatable character to produce a selected altered character with the rotation with respect to the selected reference character, wherein the rotation represents the embedded covert data, and formatting the document to produce a formatted document based on the selected altered character. The method may further comprise providing the document with a third occurrence of the character, selecting the second and third occurrences of the character as rotatable characters, altering a rotational orientation of the rotatable characters to produce altered characters with the rotation with respect to the reference characters, wherein the rotation represents the embedded covert data, and formatting the document to produce a formatted document based on the altered characters. The method may further comprise providing the document with additional occurrences of the character, wherein the second and additional occurrences of the character constitute all remaining occurrences of the character in the document beyond the first occurrence of the character, selecting the remaining occurrences of the character as rotatable characters, altering a rotational orientation of the rotatable characters to produce altered characters with the rotation with respect to the reference characters, wherein the rotation represents the embedded covert data, and formatting the document to produce a formatted document based on the altered characters. The reference character and the altered character may be formed along a straight horizontal line. The reference character and the altered character may be formed along a curved horizontal line. The method may further comprise decoding the formatted document to reveal the embedded covert data based on the altered character. The embedded covert data may be a user name. The character may be selected from the English alphabet or a predetermined subset of the English alphabet, wherein the predetermined subset includes most frequently used characters in the English alphabet and excludes least frequently used characters in the English alphabet, or wherein the predetermined subset includes characters in which rotation is visually detectable and excludes characters in which rotation is visually undetectable, or wherein the predetermined subset includes characters in which rotation has relatively low visibility and excludes characters in which rotation has relatively high visibility, or wherein the predetermined subset includes characters which exclude a relatively long horizontal line and excludes characters that include a relatively long horizontal line. The predetermined subset may include 'a' and 'e' and excludes 'r' and 'o'. The predetermined subset may include 'a', 'c', 'e' and 's'. The predetermined subset may include 'a', 'c', 'e' and 's' and excludes 'r', 'o' and 't'. The predetermined subset may consist of 'a', 'c', 'e' and 's'. The rotation of the altered character may represents a single bit or a binary sequence. The rotation may be clockwise. The rotation may be counter-clockwise. The rotation may be provided if the altered character represents a first binary value of a single bit, and the rotation is omitted if the altered character represents a second binary value of the single bit. The rotation may be clockwise if the altered character represents a first binary value of a single bit, and the rotation is counter-clockwise if the altered character represents a second binary value of the single bit. The rotation may be 2 to 12 degrees, or 6 to 8 degrees.

In an embodiment, the reference character and the altered character in the formatted document may be visually apparent to a user and a difference in rotation between the reference character and the altered character is essentially visually hidden from the user. In the document and the formatted document, the reference character and the altered character are visually apparent to a user and a difference between the document and the formatted document is essentially visually hidden to the user.

An aspect of the invention is a system for embedding covert data in a text document, the system comprising a data encoding device that receives the document with a character that occurs in first and second occurrences, wherein the device includes a memory and a processor, the memory stores the document and a predetermined rotation, and the processor selects the first occurrence of the character as a reference character and the second occurrence of the character as a rotatable character, alters a rotational orientation of the rotatable character to produce an altered character with the rotation with respect to the reference character, and formats the document to produce a formatted document based on the altered character, thereby embedding the embedded covert data in the document based on the altered character.

In embodiments, the document has multiple characters that include the character, and the processor analyzes a frequency of the multiple characters, and selects the character from the multiple characters in response to the character occurring most frequently in the multiple characters. The document may have the multiple characters include first and second characters, and the processor analyzes a frequency of the multiple characters, selects the first and second characters from the multiple characters in response to the first and second characters occurring most frequently in the multiple characters to produce selected characters; and for each of the selected characters, selects a first occurrence of the selected character as a selected reference character and a second occurrence of the selected character as a selected rotatable character, alters a rotational orientation of the selected rotatable character to produce a selected altered character with the rotation with respect to the selected reference character, wherein the rotation represents the embedded covert data, and formats the document to produce a formatted document based on the selected altered character. The document may have a third occurrence of the character, and the processor selects the second and third occurrences of the character as rotatable characters, alters a rotational orientation of the rotatable characters to produce altered characters with the rotation with respect to the reference characters, wherein the rotation represents the embedded covert data, and formats the document to produce a formatted document based on the altered characters. The document may have additional occurrences of the character, the second and additional occurrences of the character constitute all remaining occurrences of the character in the document beyond the first occurrence of the character, and the processor selects the remaining occurrences of the character as rotatable characters, alters a rotational orientation of the rotatable characters to produce altered characters with the rotation with respect to the reference characters, wherein the rotation represents the embedded covert data, and formats the document to produce a formatted document based on the altered characters.

In embodiments, the reference character and the altered character are formed along a straight horizontal line. The reference character and the altered character may be formed along a curved horizontal line. The system may further comprise a data decoding device that decodes the formatted document to reveal the embedded covert data based on the altered character. The embedded covert data may be a user name. The character may be selected from the English alphabet, or a predetermined subset of the English alphabet, and the subset may include the most frequently used characters in the English alphabet and excludes least frequently used characters in the English alphabet. The predetermined subset may include characters in which rotation is visually detectable and excludes characters in which rotation is visually undetectable, or the predetermined subset may include characters in which rotation has relatively low visibility and excludes characters in which rotation has relatively high visibility, or the predetermined subset may include characters which exclude a relatively long horizontal line and excludes characters that include a relatively long horizontal line. The predetermined subset may include 'a' and 'e', and excludes 'r' and 'o'. The predetermined subset may include 'a', 'c', 'e' and 's', and excludes 'r', 'i', 'o' and 't'. The rotation of the altered character may represent a single bit or a binary sequence. The rotation may be clockwise, or counter-clockwise. The rotation may be provided if the altered character represents a first binary value of a single bit, and the rotation is omitted if the altered character represents a second binary value of the single bit. The rotation may be clockwise if the altered character represents a first binary value of a single bit, and the rotation is counter-clockwise if the altered character represents a second binary value of the single bit. The rotation may be 2 to 12 degrees, or 6 to 8 degrees, for example.

In an embodiment, the reference character and the altered character in the formatted document are visually apparent to a user and a difference in rotation between the reference character and the altered character is essentially visually hidden from the user. In the document and the formatted document the reference character and the altered character may be visually apparent to a user and a difference between the document and the formatted document is essentially visually hidden to the user.

An aspect of the invention is a computer program product comprising a computer readable medium having computer program code means which, when loaded on a computer, makes the computer perform a method for embedding covert data in a text document, the method comprising providing the document with a character that occurs in first and second occurrences, selecting the first occurrence of the character as a reference character and the second occurrence of the character as a rotatable character, altering a rotational orientation of the rotatable character to produce an altered character with a predetermined rotation with respect to the reference character, wherein the rotation represents the embedded covert data, and formatting the document to produce a formatted document based on the altered character.

An aspect of the invention is a computer readable medium having a program recorded which, when loaded on a computer, makes the computer perform a method for embedding covert data in a text document, the method comprising providing the document with a character that occurs in first and second occurrences, selecting the first occurrence of the character as a reference character and the second occurrence of the character as a rotatable character, altering a rotational orientation of the rotatable character to produce an altered character with a predetermined rotation with respect to the reference character, wherein the rotation represents the embedded covert data, and formatting the document to produce a formatted document based on the altered character.

BRIEF DESCRIPTION OF THE DRAWINGS

In order that embodiments of the invention may be fully and more clearly understood by way of non-limitative examples, the following description is taken in conjunction with the accompanying drawings in which like reference numerals designate similar or corresponding elements, regions and portions, and in which.

DETAILED DESCRIPTION

Figure 1:
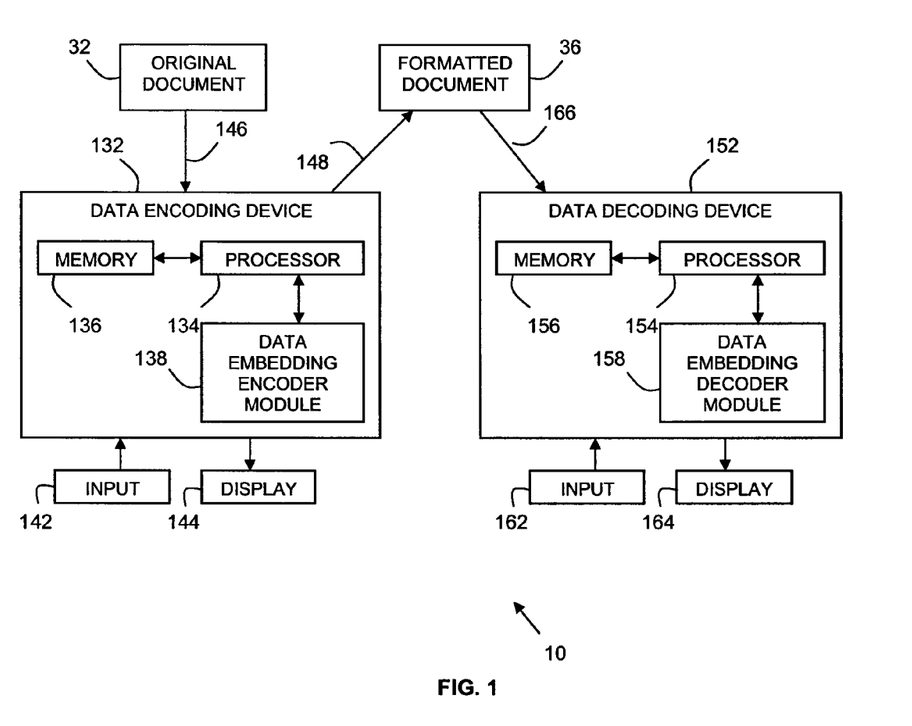
FIG. 1 shows a system in accordance with an embodiment of the invention.

FIG. 1 shows a system 10 in accordance with an embodiment of the invention for embedding covert data in and extracting the covert data from a text document. An original document 32 is embedded with covert hidden data by a data encoding device 132 which is a computer comprising a processor 134, memory 136 and data embedding encoder module 138 for encoding the covert data in the text document 32. A user may input and view the data with an input 142 and display 144. Once encoded and embedded in the formatted document 36, the formatted document 36 is transmitted to a data decoding device 152 to decode the embedded covert data in the formatted document 36. The data decoding device 152 is a computer comprising a processor 154, memory 156 and data embedding encoder module 158 for decoding the covert data in the formatted document 36. A user may input and view the data with an input 162 and display 164.

Although shown as two separate computers, it will be appreciated that the data embedding encoder and decoder modules 138 and 158 may reside on the same computer. A transmission link 146 for transmitting the original document 32 to the data encoding device 132, and transmission links 148 and 166 for transmitting the formatted document 36 from the data encoding device 132 to the data decoding device 152, may be public or private networks, the Internet and the like. The documents 32 and 36 may be hardcopies and/or electronic versions. If the documents 32 and 36 are in hardcopy form, the documents may be converted into electronic format by scanning and the like.

Figure 2:
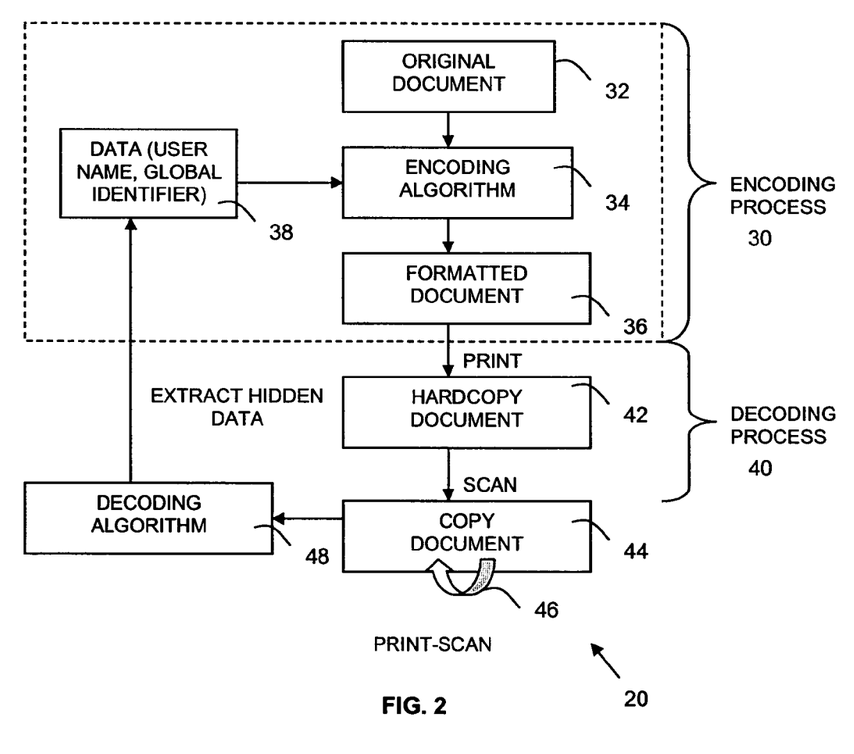
FIG. 2 shows a flow chart of a method of data hiding in a text document and data extracting from the text document that includes encoding and decoding the data in accordance with an embodiment of the invention.

FIG. 2 shows a flow chart 20 of a method of data hiding and data extracting in a text document in accordance with an embodiment of the invention that includes an encoding process 30 and a decoding process 40. The original document 32 is converted by an encoding algorithm 34 into the formatted document 36 in the encoding process 30. The data 38 to be hidden may be a user name, global identifier and the like. In the decoding process 40, the formatted document 36 is printed, a hardcopy document 42 is produced and scanned, and a copy document 44 is print-scanned 46. A decoding algorithm 48 extracts the hidden data from the copy document 44.

The invention embeds information into a text document by rotating certain characters in the text document that are not be easily noticed by human eye. The invention is not limited to any specific language as long as it is computationally feasible to distinguish the rotated character from the original (unrotated) character using decoding. To facilitate understanding the invention, the English language or characters that belong to the same character encoding family (ISO-8859-1) is chosen for the characters to illustrate how the invention is applied, however it will be appreciated that the embodiments of the invention could be applied to any other character, characters or character sets including other character sets representing other languages. Additionally, a reference point for determining the degree of rotation is chosen by a predetermined set of alphabets that remain unrotated in the document after encoding.

English text is made up of words formed from the 26 alphabet characters: {a, b, c, d, e, f, g, h, i, j, k, l, m, n, o, p, q, r, s, t, u, v, w, x, y, z}. Text documents typically are highly ordered. Since human vision is often highly sensitive to changes made to a text document, the selection of characters to be rotated is important. Characters with high order structure, for example having a long horizontal line, may be highly visible when rotated. Therefore, upper-cap characters are not preferred: {A, B, C, D, E, F, G, H, I, J, K, L, M, N, O, P, Q, R, S, T, U, V, W, X, Y, Z}. For lower-cap characters, 'a', 'c', 'e' and 's' are the least visually intrusive when rotated and therefore are preferred.

Figure 3:
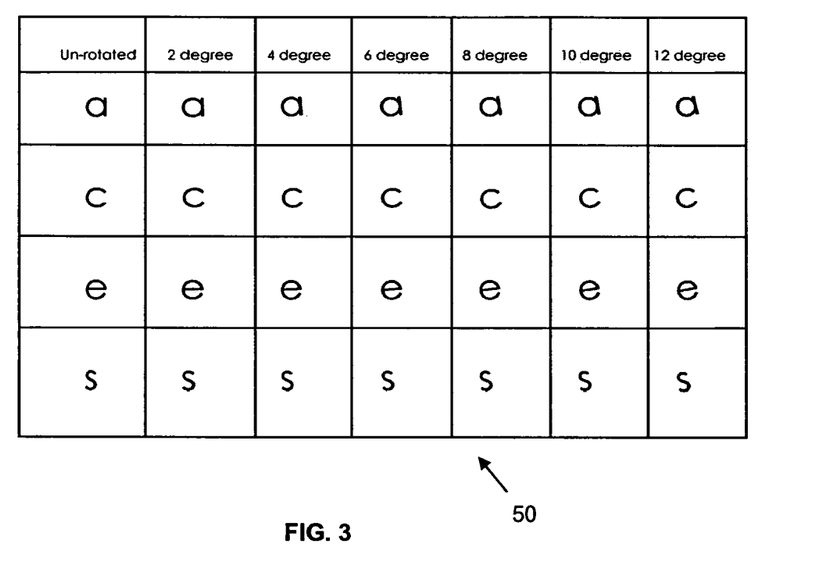
FIG. 3 shows the rotational effect on characters "a", "c", "e" and "s" in accordance with an embodiment of the invention.

FIG. 3 shows the rotational effect on characters 'a', 'c', 'e' and 's' in accordance with an embodiment of the invention. In FIG. 3, a table 50 illustrates the visual effect of rotating the four chosen characters 'a', 'c', 'e' and 's' through 2-12 degree angles counter-clockwise. The angle of rotation may be narrower such as 6-8 degrees.

Figure 4:
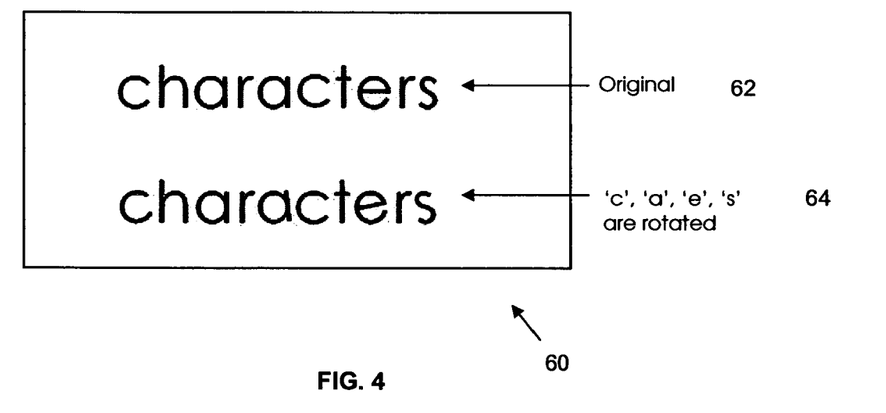
FIG. 4 shows the rotational effect on characters in a word in accordance with an embodiment of the invention.

FIG. 4 shows a character rotation 60 by rotating selected characters in the word "characters". Visually, it is difficult for the human eye to detect the difference between the original word 62 and the modified word 64 especially when direct comparison or reference to the original word 62 is made with the modified word 64.

Data Hiding Capacity

Figure 5:
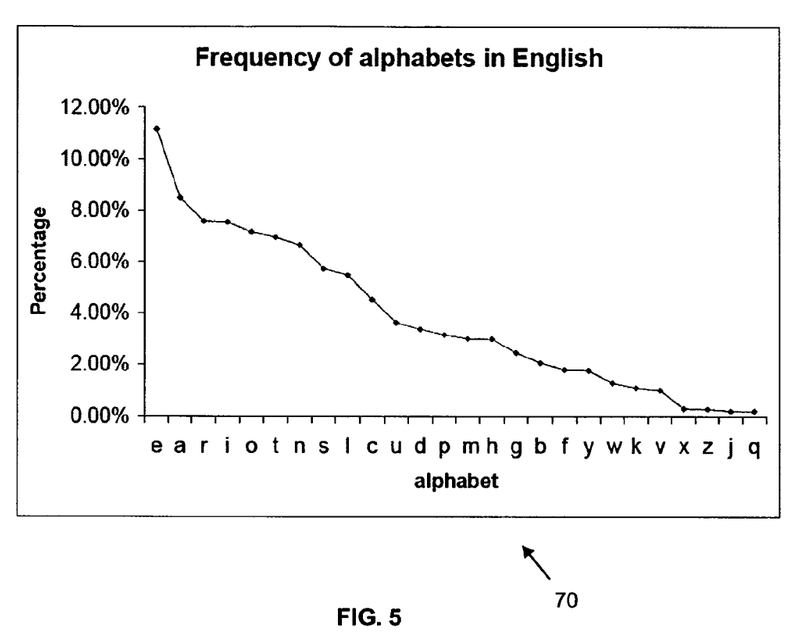
FIG. 5 shows a graph of frequency of characters used in English text.

FIG. 5 shows a graph 70 of the frequency (in percentage) of characters in English text. Characters 'a', 'c', 'e' and 's' occur with high frequency at 8.5%, 4.6%, 11.2% and 5.7% respectively. In particular, 'e' and 'a' are the most occurring characters in the English language. Hence, given a text document, a potential data hiding limit using 'a', 'c', 'e' and 's' as the rotated characters is 8.5+4.6+11.2+5.7=30% of the characters in the text.

Encoding

Figure 6:
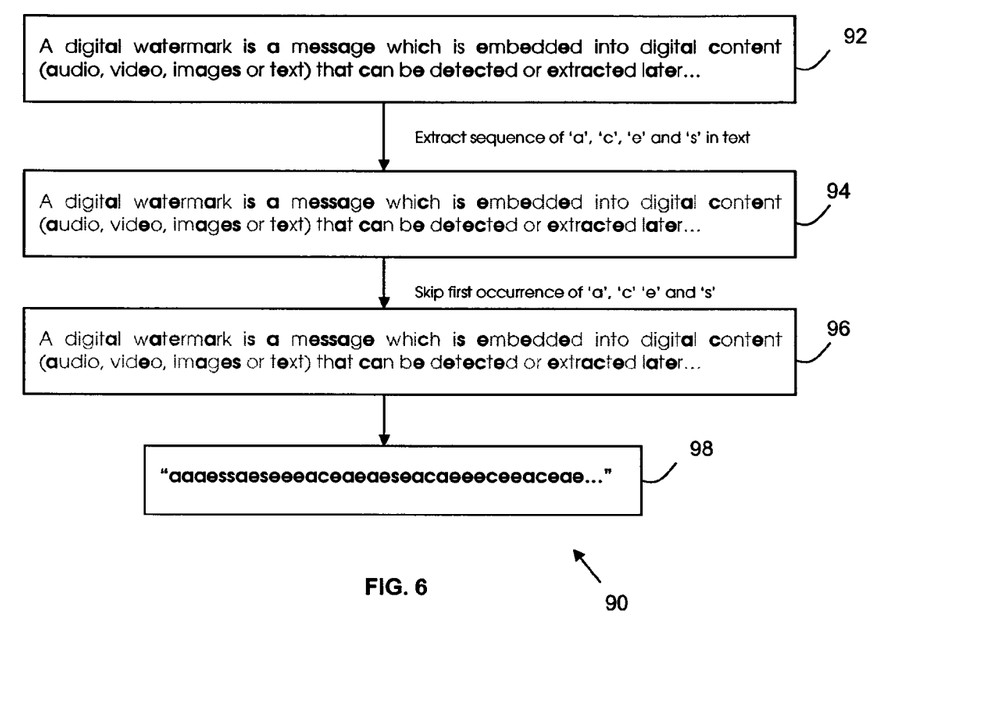
FIG. 6 shows an extracted sequence of characters from a text document in accordance with an embodiment of the invention.

FIG. 6 shows a method 90 in which, with a given text document, a "sequence" of characters 'a', 'c', 'e' and 's' is selected 92 and extracted 94 in accordance with an embodiment of the invention. The first occurrence (or instance) of 'a', 'c', 'e' and 's' is omitted 96 so that the first instances of these characters remain unrotated and can be used as reference characters in rotation detection during the decoding phase. The remaining occurrences (or instances) of these characters 98 are rotated by a predetermined rotation (such as 2-12 degrees) relative to the reference characters to embed the covert data. It will be appreciated that there could be other ways of determining the reference, for example, multiple sets of pre-determined occurrences of 'a', 'c', 'e' and 's' that remains unrotated could be used for reference point to determine degree of rotation.

Figure 7:
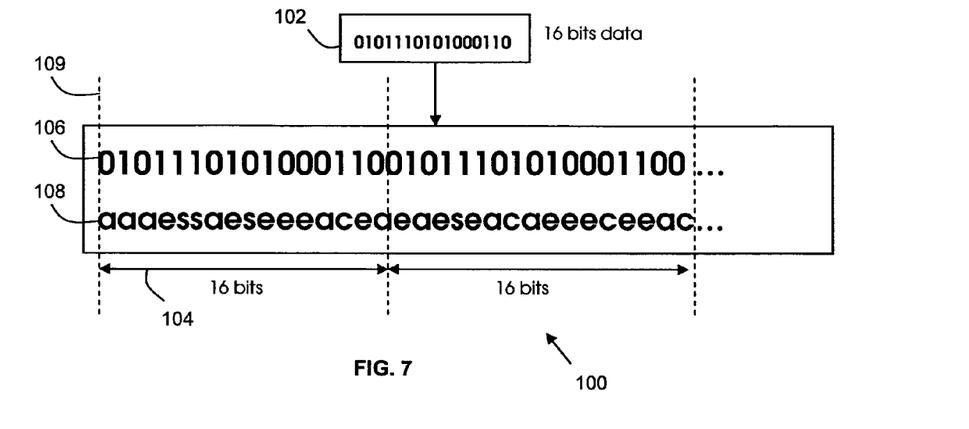
FIG. 7 shows mapping data into an extracted sequence of characters from a text document in accordance with an embodiment of the invention.

FIG. 7 shows mapping data into an extracted sequence of characters from a text document in accordance with an embodiment of the invention. To embed a 16 bit data 102, a mapping is done between the extracted sequence 108 and the 16 bit data 106, as illustrated in FIG. 7.

If a particular character in the sequence is mapped to binary value '1', the character is rotated correspondingly in the original text. If a particular character in the sequence is mapped to binary value '0', it remains unchanged in the original text.

Alternatively, in another embodiment, if a particular character in the sequence is mapped to binary value '1', the character is rotated in a first direction (such as clockwise) correspondingly in the original text. If a particular character in the sequence is mapped to binary value '0', the character is rotated in a second direction (such as counter-clockwise) correspondingly in the original text.

Embodiments of the invention are not limited by how the hidden data is mapped to the extracted sequence. For instance, a key hashed code of the hidden data may be computed and appended to the hidden data before embedding. This enables an integrity check for the hidden data during decoding. To further reduce tampering with the encoded text document, pseudo-random positions in the extracted sequence are chosen to embed the hidden data. Error correcting code (ECC) may also be used to increase robustness of the embedded data.

Figure 8:
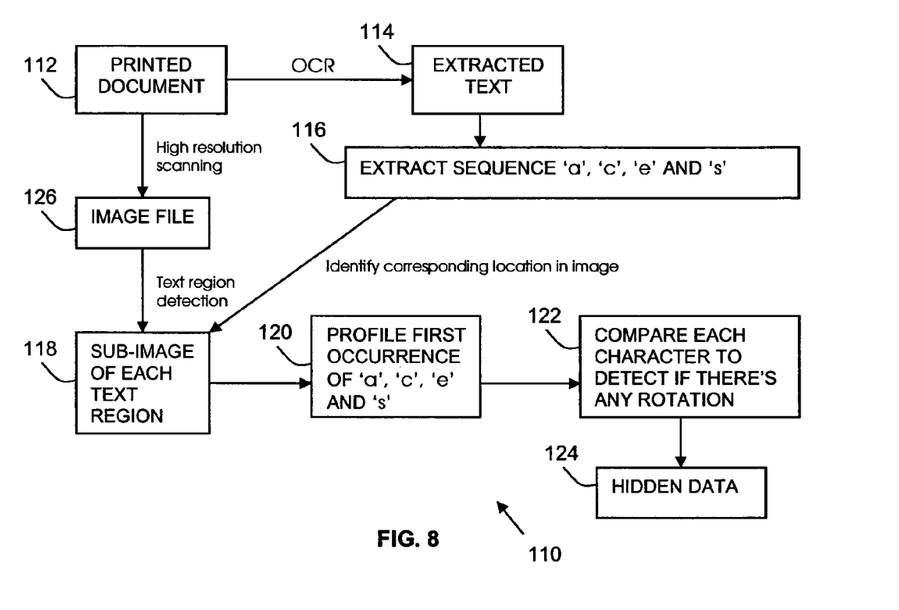
FIG. 8 shows a flow chart of a method of decoding in accordance with an embodiment of the invention.

FIG. 8 shows a decoding process 110 in accordance with an embodiment of the invention.

FIGS. 6, 7 and 8 illustrate decoding a hardcopy text document in accordance with an embodiment of the invention. An image file 126 of the printed text document 112 is obtained by a scanner at high resolution. Using a text region detection algorithm, the position of the text region is marked in the image file. Next, using an optical character recognition (OCR) algorithm, the text document is read in. The sequence of 'a', 'c', 'e' and 's' is extracted 114,116 from the text and the corresponding locations of these characters in the image file are identified.

A profile 118,120 for the first occurring 'a', 'c', 'e' and 's' is computed. The profile may include text features like edge and pixel densities. However, the invention is not limited to the type of profiling done. Since the set of first occurring 'a', 'c', 'e' and 's' are unchanged, they act as reference characters to determine 122 if the 'a', 'c', 'e' and 's' in the rest of the document are rotated or not. In this manner, the hidden data 124 that is encoded and embedded can be decoded and recovered.

It will be appreciated that data capacity is proportional to text information in the document, and processing is performed in verification, for example OCR.

Figure 9:
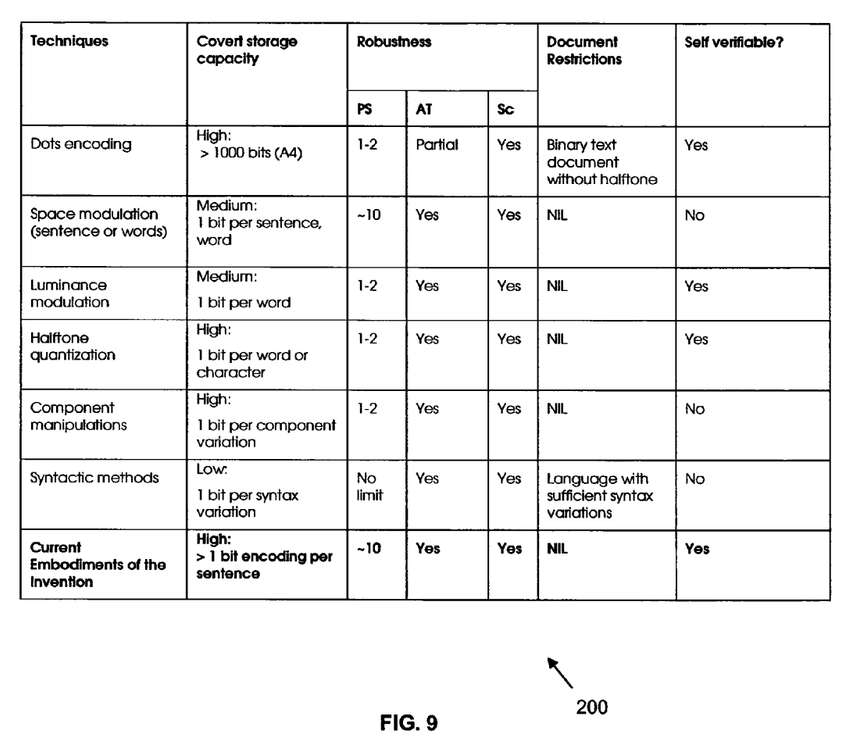
FIG. 9 shows a comparison table of conventional data hiding techniques in a text document with an embodiment of the invention.

FIG. 9 shows a comparison table 200 of the storage characteristics, robustness, text document limitations and security for conventional data hiding techniques in a text document with an embodiment of the invention.

The invention is applicable to various text documents such as transcripts, diplomas, certificates and the like in the academic field; shares and bonds certificates, insurance policies, statements of account, letters of credit, legal forms and the like in the financial field; immigration visas, titles, financial instruments, contracts, licenses and permits, classified documents and the like in the government field; prescriptions, control chain management, medical forms, vital records, printed patient information and the like in the health care field; schematics, cross-border trade documents, internal memos, business plans, proposals, designs and the like in the business field; tickets, postage stamps, manuals and books, coupons, gift certificates, receipts and the like in general consumer field; and many other applications and fields.

The methods and systems described in FIGS. 1-9 may be implemented on any suitable server, workstation, personal computer (PC), laptop computer, handheld device, with visual displays and/or monitors, telephones, cellular telephones, wireless devices, PDAs, Internet appliances, set top boxes, modems and the like. The devices and subsystems, for example, may communicate with each other using any suitable protocol and may be implemented using a general-purpose computer system and the like. Interface mechanisms may be employed, including Internet access and telecommunications in any suitable form such as voice, modem, wireless communications media and the like. Accordingly, a network may include wireless communications networks, cellular communications network, Public Switched Telephone Networks (PSTNs), Packet Data Networks (PDNs), the Internet, intranets, hybrid communications networks, combinations thereof and the like.

It is to be understood that the embodiments, as described above, are for exemplary purposes, as many variations of the specific hardware used to implement the disclosed exemplary embodiments are possible. For example, the functionality of the method and system may be implemented via one or more programmed computer system or devices. To implement such variations as well as other variations, a single computer system may be programmed to perform the functions of one or more of the modules of the exemplary systems. On the other hand, two or more programmed computer systems or devices may be substituted for any one of the devices and subsystems of the exemplary systems. Accordingly, the principles and advantages of distributed processing, such as redundancy, replication and the like may be implemented as desired, for example to increase robustness and performance of the exemplary systems described above.

The exemplary systems described above may store information relating to various processes described herein. This information may be stored in one or more memories, such as a hard disk, optical disk, magneto-optical disk, RAM and the like, of the devices and subsystems of the embodiments. One or more databases of the devices and subsystems may store the information used to implement the exemplary embodiments. The databases may be organized using data structures, such as records, tables, arrays, fields, graphs, trees, lists and the like, included in one or more memories, such as the memories listed above.

All or a portion of the exemplary systems described above may be conveniently implemented using one or more general-purpose computer systems, microprocessors, digital signal processors, micro-controllers and the like, programmed according to the teachings of the disclosed exemplary embodiments. Appropriate software may be readily prepared by programmers of ordinary skill based on the teachings of the disclosed exemplary embodiments. In addition, the exemplary systems may be implemented by the preparation of application-specific integrated circuits or by interconnecting an appropriate network of component circuits.

While embodiments of the invention have been described and illustrated, it will be understood by those skilled in the technology concerned that many variations or modifications in details of design or construction may be made without departing from the invention.

The invention claimed is:

1. A method for embedding covert data in a text document, the method comprising:
   providing the document with multiple characters that include a first character that occurs in first and second occurrences;
   analyzing a frequency of the multiple characters;
   selecting the first character from the multiple characters in response to the first character occurring most frequently in the multiple characters;
   selecting the first occurrence of the first character as a reference character and the second occurrence of the first character as a rotatable character;
   altering a rotational orientation of the rotatable character to produce an altered character with a predetermined rotation with respect to the reference character, wherein the rotation represents the embedded covert data; and
   formatting the document to produce a formatted document based on the altered character.

2. A method as claimed in claim 1, further comprising:
   selecting the first character and a second character from the multiple characters in response to the first character and the second character occurring most frequently in the multiple characters to produce selected characters; and
   for each of the selected characters,
   selecting a first occurrence of the selected character as a selected reference character and a second occurrence of the selected character as a selected rotatable character;
   altering a rotational orientation of the selected rotatable character to produce a selected altered character with the rotation with respect to the selected reference character, wherein the rotation represents the embedded covert data; and
   formatting the document to produce a formatted document based on the selected altered character.

3. A method as claimed in claim 1, further comprising:
   providing the document with a third occurrence of the first character;
   selecting the second and third occurrences of the first character as rotatable characters;
   altering a rotational orientation of the rotatable characters to produce altered characters with the rotation with respect to the reference characters, wherein the rotation represents the embedded covert data; and
   formatting the document to produce a formatted document based on the altered characters.

4. A method as claimed in claim 1, further comprising:
   providing the document with additional occurrences of the first character, wherein the second and additional occurrences of the first character constitute all remaining occurrences of the first character in the document beyond the first occurrence of the first character;
   selecting the remaining occurrences of the first character as rotatable characters;
   altering a rotational orientation of the rotatable characters to produce altered characters with the rotation with respect to the reference characters, wherein the rotation represents the embedded covert data; and
   formatting the document to produce a formatted document based on the altered characters.

5. A method as claimed in claim 1, wherein the reference character and the altered character are formed along a straight horizontal line.

6. A method as claimed in claim 1, wherein the reference character and the altered character are formed along a curved horizontal line.

7. A method as claimed in claim 1, further comprising decoding the formatted document to reveal the embedded covert data based on the altered character.

8. A method as claimed in claim 1, wherein the embedded covert data is a user name.

9. A method as claimed in claim 1, wherein the first character is selected from the English alphabet.

10. A method as claimed in claim 1, wherein the first character is selected from a predetermined subset of the English alphabet.

11. A method as claimed in claim 10, wherein the predetermined subset includes characters 'a', 'c', 'e' and 's' of the English alphabet.

12. A method as claimed in claim 10, wherein the predetermined subset includes characters in which rotation is visually detectable and excludes characters in which rotation is visually undetectable.

13. A method as claimed in claim 10, wherein the predetermined subset includes characters which exclude uppercase characters.

14. A method as claimed in claim 1, wherein the rotation of the altered character represents a single bit.

15. A method as claimed in claim 1, wherein the rotation of the altered character represents a binary sequence.

16. A method as claimed in claim 1, wherein the rotation is clockwise.

17. A method as claimed in claim 1, wherein the rotation is counter-clockwise.

18. A method as claimed in claim 1, wherein the rotation is provided if the altered character represents a first binary value of a single bit, and the rotation is omitted if the altered character represents a second binary value of the single bit.

19. A method as claimed in claim 1, wherein the rotation is clockwise if the altered character represents a first binary value of a single bit, and the rotation is counter-clockwise if the altered character represents a second binary value of the single bit.

20. A method as claimed in claim 1, wherein the reference character and the altered character in the formatted document are visually apparent to a user and a difference in rotation between the reference character and the altered character is visually undetectable to the user.

21. A method as claimed in claim 1, wherein in the document and the formatted document the reference character and the altered character are visually apparent to a user and a difference between the document and the formatted document is visually undetectable to the user.

22. A system for embedding covert data in a text document, the system comprising:
   a data encoding device that receives the document with multiple characters that include a character that occurs in first and second occurrences, wherein the device includes a memory and a processor;
   the memory stores the document and a predetermined rotation; and
   the processor analyzes a frequency of the multiple characters, selects the character from the multiple characters in response to the character occurring most frequently in the multiple characters, selects the first occurrence of the character as a reference character and the second occurrence of the character as a rotatable character, alters a rotational orientation of the rotatable character to produce an altered character with the rotation with respect to the reference character, and formats the document to produce a formatted document based on the altered character, thereby embedding the embedded covert data in the document based on the altered character.

23. A computer program product comprising:
a non-transitory computer readable medium having computer program code means which, when loaded on a computer, makes the computer perform a method for embedding covert data in a text document, the method comprising:
providing the document with multiple characters that include a character that occurs in first and second occurrences;
analyzing a frequency of the multiple characters;
selecting the character from the multiple characters in response to the first and second characters occurring most frequently in the multiple characters;
selecting the first occurrence of the character as a reference character and the second occurrence of the character as a rotatable character;
altering a rotational orientation of the rotatable character to produce an altered character with a predetermined rotation with respect to the reference character, wherein the rotation represents the embedded covert data; and
formatting the document to produce a formatted document based on the altered character.

24. A non-transitory computer readable medium having a program recorded which, when loaded on a computer, makes the computer perform a method for embedding covert data in a text document, the method comprising:
providing the document with multiple characters that include a character that occurs in first and second occurrences;
analyzing a frequency of the multiple characters;
selecting the character from the multiple characters in response to the character occurring most frequently in the multiple characters;
selecting the first occurrence of the character as a reference character and the second occurrence of the character as a rotatable character;
altering a rotational orientation of the rotatable character to produce an altered character with a predetermined rotation with respect to the reference character, wherein the rotation represents the embedded covert data; and
formatting the document to produce a formatted document based on the altered character.

* * * * *